US009918582B2

(12) United States Patent
Song et al.

(10) Patent No.: US 9,918,582 B2
(45) Date of Patent: Mar. 20, 2018

(54) PORTABLE MANUALLY-OPERATED COFFEE MAKER

(71) Applicants: Jianfang Song, Zhongshan (CN); Yves Lucien Hugo Cailleton, Zhongshan (CN)

(72) Inventors: Jianfang Song, Zhongshan (CN); Yves Lucien Hugo Cailleton, Zhongshan (CN)

(*) Notice: Subject to any disclaimer, the term of this patent is extended or adjusted under 35 U.S.C. 154(b) by 173 days.

(21) Appl. No.: 14/771,364

(22) PCT Filed: Mar. 25, 2014

(86) PCT No.: PCT/CN2014/074002
§ 371 (c)(1),
(2) Date: Aug. 28, 2015

(87) PCT Pub. No.: WO2015/018202
PCT Pub. Date: Feb. 12, 2015

(65) Prior Publication Data
US 2016/0000253 A1 Jan. 7, 2016

(30) Foreign Application Priority Data
Aug. 8, 2013 (CN) .......................... 2013 1 0345121

(51) Int. Cl.
*A47J 31/32* (2006.01)
*A47J 31/00* (2006.01)
(Continued)

(52) U.S. Cl.
CPC ............. *A47J 31/005* (2013.01); *A47J 31/38* (2013.01); *A47J 31/407* (2013.01); *A47J 31/46* (2013.01); *A47J 31/462* (2013.01)

(58) Field of Classification Search
CPC ........ A47J 31/38; A47J 31/005; A47J 31/462; A47J 31/46; A47J 31/407
(Continued)

(56) References Cited

U.S. PATENT DOCUMENTS 5,622,099 A * 4/1997 Frei ..................... A47J 31/3671
99/287
2008/0302252 A1 12/2008 O'Brien et al.
(Continued)

FOREIGN PATENT DOCUMENTS

| CN | 101225806 A | 7/2008 |
| CN | 201119687 Y | 9/2008 |

(Continued)

OTHER PUBLICATIONS

Jul. 1, 2014 Search Report issued in International Patent Application No. PCT/CN2014/074002.
(Continued)

*Primary Examiner* — Thien S Tran
(74) *Attorney, Agent, or Firm* — Oliff PLC (57) ABSTRACT

A portable manually-operated coffee maker includes a cup body, a hydraulic base body, and a coffee brewing base body detachably connected into one piece. The hydraulic base body is disposed between the cup body and the coffee brewing base body. A water storage cavity, a water inlet passage, and a water outlet passage are disposed in the hydraulic base body. The water inlet passage is in communication with the water storage cavity and the cup body. An accommodating cavity and a coffee outlet passage are disposed in the coffee brewing base body. The water outlet passage is in communication with the water storage cavity and the accommodating cavity. A water inlet control valve is disposed in the water inlet passage, and a water outlet
(Continued)

control valve is disposed in the water outlet passage. A hydraulic power rod is disposed in the water storage cavity.

14 Claims, 6 Drawing Sheets

(51) Int. Cl.
    *A47J 31/38*    (2006.01)
    *A47J 31/40*    (2006.01)
    *A47J 31/46*    (2006.01)

(58) Field of Classification Search
    USPC ......... 99/279, 287, 288, 295, 297, 299, 307; 426/77, 115, 433
    See application file for complete search history.

(56) References Cited

U.S. PATENT DOCUMENTS

| | | |
|---|---|---|
| 2010/0011966 A1 | 1/2010 | Nielsen et al. |
| 2010/0116143 A1* | 5/2010 | Cerroni ............ A47J 31/38 99/297 |
| 2011/0062153 A1* | 3/2011 | Wang ............... C02F 1/002 220/23.86 |
| 2012/0260806 A1* | 10/2012 | Rolfes ............. A47J 31/38 99/285 |
| 2013/0186280 A1* | 7/2013 | Sekiguchi ......... A47J 31/005 99/287 |

FOREIGN PATENT DOCUMENTS

| | | |
|---|---|---|
| CN | 202553556 U | 11/2012 |
| CN | 103142142 A | 6/2013 |
| CN | 103142144 A | 6/2013 |
| CN | 103654412 A | 3/2014 |
| CN | 203506413 U | 4/2014 |
| DE | 2121322 A1 | 11/1972 |
| JP | 2000-042725 A | 2/2000 |
| JP | 2007-170319 A | 7/2007 |
| JP | 2016-528305 A | 9/2016 |

OTHER PUBLICATIONS

May 27, 2015 Office Action issued in Chinese Patent Application No. 201310345121.5.

Oct. 11, 2016 Exteneded Search Report issued in European Patent Application No. 14834004.5.

Feb. 15, 2017 Notice of Acceptance issued in Australian Patent Application No. 2014305562.

May 19, 2017 Office Action issued in Korean Patent Application No. 1020167000848.

* cited by examiner

PORTABLE MANUALLY-OPERATED COFFEE MAKER

BACKGROUND

Technical Field

The present invention relates to a coffee maker for brewing coffee, and more particularly to a portable manually-operated coffee maker which is convenient to carry and used for brewing a coffee pod.

Related Art

To cater for people's demands on coffee, coffee pods convenient for brewing are available in the market. The coffee pods, for example, E.S.E coffee pods and various types of coffee capsules, are made by packing freshly ground coffee powder into small cups or bags, which avoids problems such as turning sour and oxidization of the coffee beans or coffee powder exposed in the air, so the brewed coffee smells good. An existing coffee pod machine is an indoor machine of a large size, so it is clumsy and inconvenient to carry, and cannot be used outdoors.

SUMMARY

To solve the defects in the prior art, the present invention provides a portable manually-operated coffee maker which is small and convenient to carry.

Therefore, the present invention adopts the following technical solution.

A portable manually-operated coffee maker includes a cup body, a hydraulic base body, and a coffee brewing base body which are detachably connected into one piece. The hydraulic base body is disposed between the cup body and the coffee brewing base body. A water storage cavity, a water inlet passage, and a water outlet passage are disposed in the hydraulic base body. The water inlet passage is in communication with the water storage cavity and the cup body. An accommodating cavity in communication with the water outlet passage and capable of accommodating various types of coffee pods and a coffee outlet passage in communication with the accommodating cavity are disposed in the coffee brewing base body. The water outlet passage is in communication with the water storage cavity and the accommodating cavity. A water inlet control valve for controlling opening/closing of the water flow from the cup body to the water storage cavity is disposed in the water inlet passage, and a water outlet control valve for controlling opening/closing of the water flow from the water storage cavity to the accommodating cavity is disposed in the water outlet passage. A hydraulic power rod for controlling the water inlet control valve to be opened when moving towards the outside of the water storage cavity and controlling the water outlet control valve to be opened when moving towards the inside of the water storage cavity is disposed in the water storage cavity.

In the portable manually-operated coffee maker, a coffee outlet control valve for controlling opening/closing of the water flow in the coffee outlet passage is disposed in the coffee outlet passage.

In the portable manually-operated coffee maker, the cup body and the hydraulic base body are in threaded connection.

In the portable manually-operated coffee maker, the hydraulic base body and the coffee brewing base body are in threaded connection.

In the portable manually-operated coffee maker, a water injection puncturing portion capable of being inserted into the coffee pod is disposed above the accommodating cavity, a guide passage in communication with the water outlet passage and used for guiding water into the coffee pod is disposed in the water injection puncturing portion, a coffee guide passage in communication with the coffee outlet passage is disposed at a bottom portion of the accommodating cavity, an outlet puncturing portion capable of being inserted into the coffee pod is disposed on the coffee guide passage and at a bottom end of the accommodating cavity, and a coffee guide hole in communication with the coffee guide passage and used for guiding out the coffee in the coffee pod is disposed in the outlet puncturing portion.

In the portable manually-operated coffee maker, a coffee pod accommodating cup is disposed in the coffee brewing base body, the accommodating cavity is disposed in the coffee pod accommodating cup, and the outlet puncturing portion is disposed on an inner wall of a bottom end of the coffee pod accommodating cup.

In the portable manually-operated coffee maker, a cup lid for covering an open end of the coffee pod accommodating cup is disposed on a water outlet end of the hydraulic base body, the water injection puncturing portion is disposed on the cup lid, and a seal ring is disposed between the coffee pod accommodating cup and the cup lid.

In the portable manually-operated coffee maker, the hydraulic base body is a hollow water tank base connected to an open end of the cup body, a hydraulic power rod extending port is disposed on a side wall of the hydraulic base body, a water tank lid in communication with the cup body and the water inlet passage is disposed on the hydraulic base body and at one end of the cup body, a water tank is disposed in the hydraulic base body, the water storage cavity is disposed in the water tank, a hydraulic power rod sliding guide sleeve fitted on the hydraulic power rod is disposed on the water tank and connected to one end of the hydraulic power rod extending port, the hydraulic power rod is provided with a button connected to one end of the hydraulic power rod extending port, a button guide sleeve for guiding the button is disposed in the hydraulic base body, and a restoring spring is disposed between the button and the hydraulic power rod sliding guide sleeve.

In the portable manually-operated coffee maker, the button guide sleeve is provided with an arc-shaped step on an end surface of an inner side of the water storage cavity, and the button is provided with a limiting boss on one end of the inner side of the water storage cavity, the limiting boss being capable of pressing against the arc-shaped step to prevent the button from axially sliding out when the button is turned by a certain angle.

In the portable manually-operated coffee maker, a water inlet port in communication with the cup body and the water inlet passage is disposed on the water tank lid, the water inlet control valve includes a water inlet control spring having one end resting on an inner wall of the water inlet passage and a water inlet control valve core pressing against another end of the water inlet control spring, an end surface of the water inlet control valve core is capable of blocking the water inlet port, and the water outlet control valve includes a water outlet control valve core having one end capable of blocking the water outlet port of the water outlet passage and a water outlet control spring having one end pressing against the hollow water tank base and another end pressing against the water outlet control valve core.

In the portable manually-operated coffee maker, the coffee outlet control valve includes a coffee outlet control valve core having one end capable of blocking a coffee outlet port of the coffee outlet passage and a coffee outlet control spring having one end urged against the coffee outlet control valve core and another end pressing against an inner wall of the coffee outlet passage.

In the portable manually-operated coffee maker, the cup body is a single-layer cup body made of plastic or metal.

In the portable manually-operated coffee maker, the cup body is a double-layer cup body made of plastic or metal.

In the portable manually-operated coffee maker, the double-layer cup body includes an inner layer having a water accommodating cavity and an outer layer outside the inner layer.

The present invention has the following beneficial effects. In the vertical structure of the coffee maker, the cup body, the hydraulic base body, and the coffee brewing base body are detachably connected into one piece, and the hydraulic base body is disposed between the cup body and the coffee brewing base body. The three parts are vertically assembled for use, the assembled parts form a cylinder, and the three parts can be detached for carrying. In the horizontal structure of the coffee maker, the water tank is disposed in the hydraulic base body, the hydraulic power rod extends from the right side of the water tank into the water tank, and the hydraulic power rod may be a piston rod capable of horizontally extending from the hydraulic base body. The coffee maker has a simple structure and a small size, and is thus convenient to carry. The cup body can store water of high temperature and has a thermal insulation effect. When the hydraulic power rod is pulled outward, negative pressure is produced in the water storage cavity, the water inlet control valve core moves downward, the water inlet passage is opened, and water flows into the water storage cavity. When the hydraulic power rod is pushed inward, high pressure is produced in the water storage cavity, the water inlet control valve core moves upward, the water inlet passage is closed, the water outlet control valve core moves downward, the water outlet passage is opened, and water flows into the accommodating cavity to brew the coffee pod. When the pressure in the accommodating cavity is sufficiently high, the coffee outlet control valve is pushed open to discharge coffee. Therefore, the operation is simple. To facilitate puncturing of the coffee pod, the water injection puncturing portion is disposed on the water outlet end of the hydraulic base body, and used for puncturing the upper end of the coffee pod and injecting water. The outlet puncturing portion is disposed on the bottom portion of the accommodating cavity, and used for puncturing the bottom of the coffee pod. When water flows through the coffee pod, coffee flows out from the outlet puncturing portion. In this way, the coffee brewing is easier and more convenient. The coffee outlet control valve prevents water absorbed in the coffee pod from seeping out to cause dripping and even leakage, and can raise the pressure. Only when the pressure in the accommodating cavity is sufficiently high, the valve can be opened, and foam is produced in the discharged coffee to make the coffee taste better. After the coffee maker is used, the button can be locked. The button is pressed down to push the piston rod into the water storage cavity and is turned by an angle to be retained to the arc-shaped step, so that the button may not be popped out and can be easily accommodated. The coffee outlet control valve is disposed in the coffee outlet passage, and the eventually discharged coffee is pushed out under certain pressure and has certain velocity. Therefore, when coffee is poured, certain impact is produced to cause foam on the surface of the coffee, so the coffee tastes better.

DETAILED DESCRIPTION

The present invention is described in detail below with reference to the accompanying drawings and embodiments.

As shown in FIG. 1 to FIG. 8, a portable manually-operated coffee maker includes a cup body 1, a hydraulic base body 2, and a coffee brewing base body 3 which are detachably connected into one piece, and the three parts are in vertical threaded connection to form a cylinder after assembly. The cup body 1 may be a vacuum cup, a plastic cup, or any other water storage cup. The structure of the cup body 1 may be a single-layer cup body which is made of plastic or metal and has a large volume, or may be a double-layer cup body which is made of plastic or metal and has a small volume. The double-layer structure includes an inner layer 11 having a water accommodating cavity and an outer layer 12 outside the inner layer 11. Such a vacuum cup can preserve water temperature for 24 hours, and the volume of the cup body 1 varies according to actual demands. The hydraulic base body 2 is disposed between the cup body 1 and the coffee brewing base body 3. A water storage cavity 21, a water inlet passage 22, and a water outlet passage 23 are disposed in the hydraulic base body 2. The water inlet passage 22 is in communication with the water storage cavity 21 and the cup body 1. The hydraulic base body 2 is a hollow water tank base connected to an open end of the cup body 1. A hydraulic power rod extending port 270 is disposed on a side wall of the hollow water tank base. A water tank lid 28 in communication with the cup body 1 and the water inlet passage 22 is disposed on the hollow water tank base and at one end of the cup body 1. A water inlet port 202 in communication with the cup body 1 and the water inlet passage 22 is disposed on the water tank lid 28. The water tank lid 28 is in threaded connection to a lower opening of the cup body 1. A water tank 29 is disposed in the hollow water tank base. The water inlet passage 22, the water outlet passage 23, and the water storage cavity 21 are disposed in the water tank 29. The volume of the water tank 29 varies according to actual demands. The water tank base is a hollow cylinder, and the water tank lid 28 is disposed in an upper opening of the hollow water tank base. A water inlet control valve 24 for controlling opening/closing of the water flow from the cup body 1 to the water storage cavity 21 is disposed in the water inlet passage 22. The water inlet control valve 24 includes a water inlet control spring 241 having one end resting on an inner wall of the water inlet passage 22 and a water inlet control valve core 242 pressing against another end of the water inlet control spring 241. An end surface of the water inlet control valve core 242 is capable of blocking the water inlet port 202. When negative pressure is produced in the water tank 29, that is, the pressure in the cup body 1 is higher than that in the water tank 29, and when the pressure difference is large enough to resist an elastic force of the water inlet control spring 241, the water inlet control valve core 242 moves downward, the water inlet port 202 is opened, the water inlet passage 22 is in an open state, and water flows into the water tank 29. An accommodating cavity 31 in communication with the water outlet passage 23 and capable of accommodating various types of coffee pods 4 and a coffee outlet passage 32 in communication with the accommodating cavity 31 are disposed in the coffee brewing base body 3. The water outlet passage 23 is in communication with the water storage cavity 21 and the accommodating cavity 31, and a water outlet control valve 25 for controlling opening/closing of the water flow from the water storage cavity 21 to the accommodating cavity 31 is disposed in the water outlet passage 23. The water outlet control valve 25 includes a water outlet control valve core 252 having one end capable of blocking a water outlet port 203 of the water outlet passage 23 and a water outlet control spring 251 having one end pressing against the hollow water tank base and another end pressing against the water outlet control valve core 252. When high pressure is produced in the water storage cavity 21, that is, the pressure in the water storage cavity 21 is higher than that in the accommodating cavity 31, and when the pressure is large enough to resist an elastic force of the water outlet control spring 251, the water outlet control valve core 25 is pushed to move downward, the water outlet port 203 is opened, and water in the water storage cavity 21 flows into the accommodating cavity 31. A hydraulic power rod 26 for controlling the water inlet control valve 24 to be opened when moving towards the outside of the water storage cavity 21 and controlling the water outlet control valve 25 to be opened when moving towards the inside of the water storage cavity 21 is disposed in the water storage cavity 21. The hydraulic power rod 26 is a piston rod, and when moving in the water storage cavity 21, the piston rod works against the air in the water storage cavity 21 to produce negative pressure or high pressure, so as to suck open the water inlet control valve 24 or push open the water outlet control valve 25. A hydraulic power rod sliding guide sleeve 291 fitted on the hydraulic power rod 26 is disposed on the water tank 29 and connected to one end of the hydraulic power rod extending port 270. The hydraulic power rod sliding guide sleeve 291 can be in threaded connection to an open end on the right side of the water tank 29. In this way, the water tank 29, the hydraulic power rod sliding guide sleeve 291, and the hydraulic power rod 26 form a power device disposed in the hollow water tank base which is in the form of a hollow cylinder. Therefore, the structure is compact. The hydraulic power rod sliding guide sleeve 291 is disposed on one end of the water tank. The hydraulic power rod 26 is disposed on one side of the water tank 29, that is, extends from one end of the water tank 29 into the water tank 29. The hydraulic power rod 26 is provided with a button 260 connected to one end of the hydraulic power rod extending port 270. The button 260 is pulled or pressed for controlling the hydraulic power rod 26 to move back and forth in the water storage cavity 21. A button guide sleeve 271 for guiding the button 260 is disposed in the hollow water tank base. A restoring spring 30 is disposed between the button 260 and the hydraulic power rod sliding guide sleeve 291. The hydraulic power rod 26 and the button 260 can be popped out under a restoring force of the restoring spring 30. When the button 260 is pressed down to push the piston rod into the water tank 29, the piston rod can be popped out under a restoring force of the restoring spring 30. In this way, the piston rod does not need to be manually pulled out for water injection into the water tank 29. The operation is easier and more convenient. To facilitate accommodation of the hydraulic power rod 26 and the button 260, a locking device can be disposed to lock the button and prevent the button 260 from popping out. In the specific structure, the button guide sleeve 271 is provided with an arc-shaped step 272 on an end surface of an inner side of the water storage cavity 21, and the button 260 is provided with a limiting boss 261 on one end of the inner side of the water storage cavity 21, the limiting boss 261 being capable of pressing against the arc-shaped step 272 to prevent the button 260 from axially sliding out when the button 260 is turned by a certain angle. When the button 260 pushes the hydraulic power rod 26 into the water storage cavity 21, the button 260 is turned by an angle, and the limiting boss 261 is retained to the arc-shaped step 272, so that the hydraulic power rod 26 may not be popped out. Definitely, the locking device is not limited to the above structure, and other securing devices are also applicable. A coffee outlet passage 32 in communication with a bottom end of the accommodating cavity 31 is disposed in the coffee brewing base body 3. A coffee outlet control valve 33 for controlling opening/closing of the coffee outlet passage 32 is disposed in the coffee outlet passage 32. The valve prevents dripping and raises pressure in the accommodating cavity 31. The coffee outlet control valve 33 includes a coffee outlet control valve core 331 having one end capable of blocking a coffee outlet port 302 of the coffee outlet passage 32 and a coffee outlet control spring 332 having one end urged against the coffee outlet control valve core 331 and another end pressing against an inner wall of the coffee outlet passage 32. As the water flow continuously flows into the accommodating cavity 31 under the atmospheric pressure, the pressure in the accommodating cavity 31 is continuously increased, and when the pressure difference between the pressure in the accommodating cavity 31 and the outside atmospheric pressure is large enough to resist an elastic force of the coffee outlet control spring 332, the coffee outlet control valve core 331 is pushed to move downward, the coffee outlet port 302 is opened, and coffee is discharged.

Figure 1:
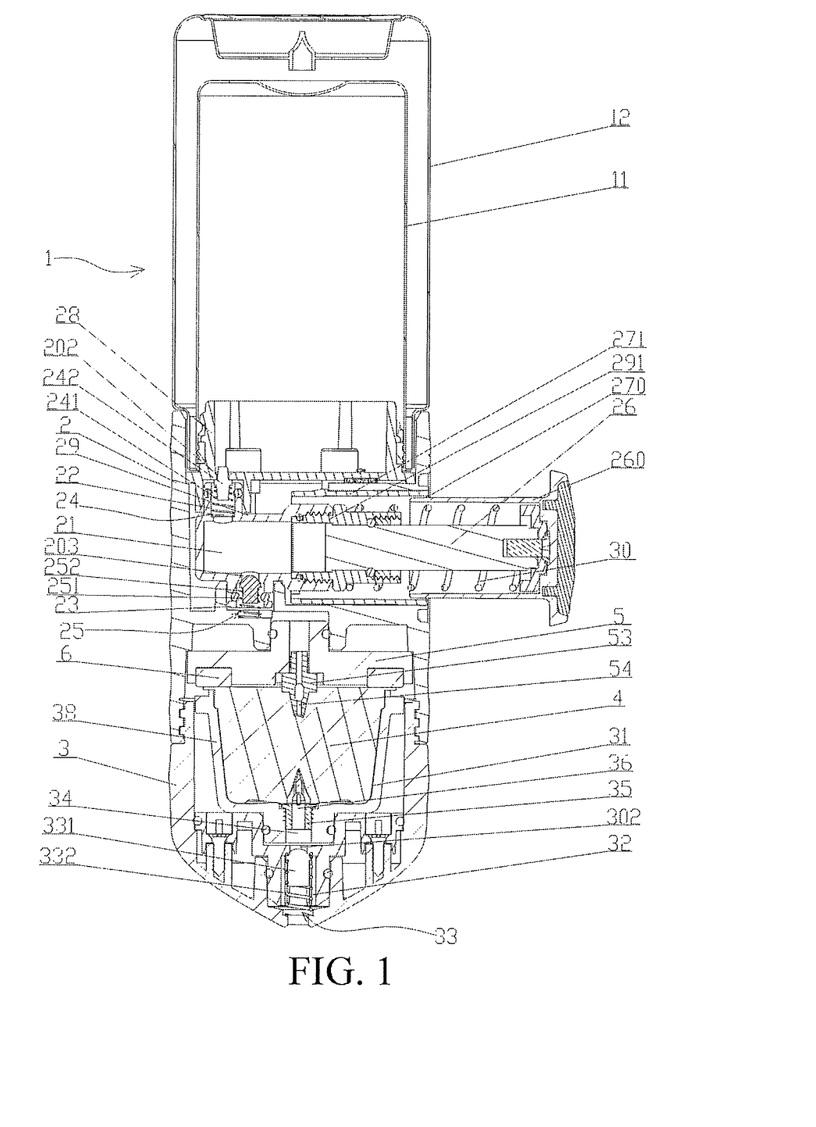
FIG. 1 is a front cross-sectional view of the present invention.
Figure 2:
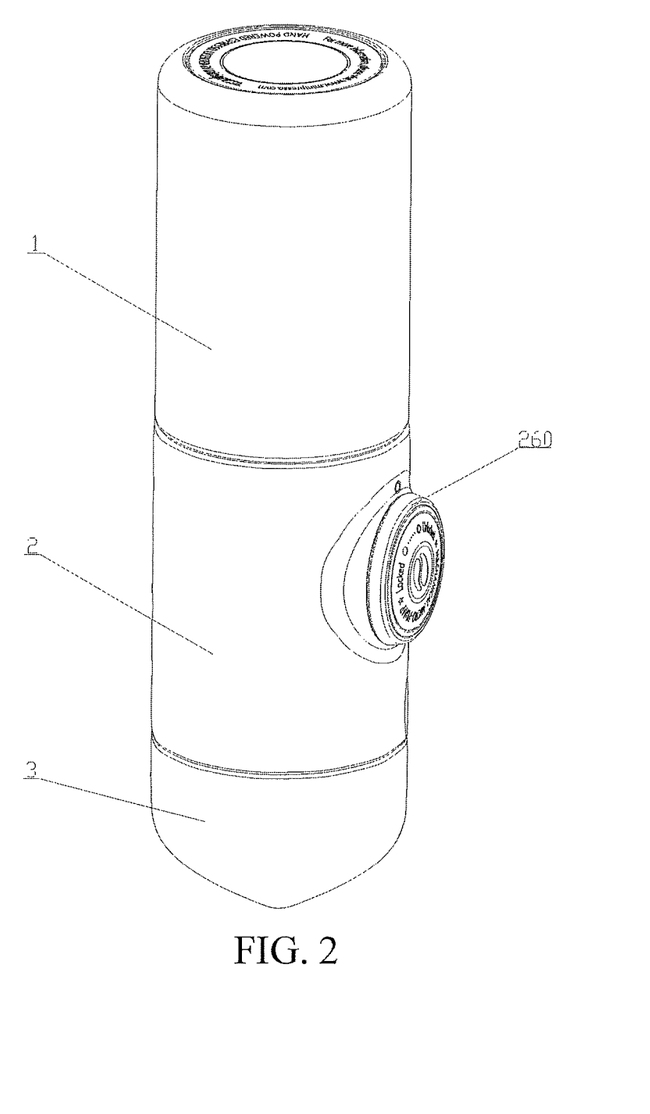
FIG. 2 is a three-dimensional view of the present invention.
Figure 3:
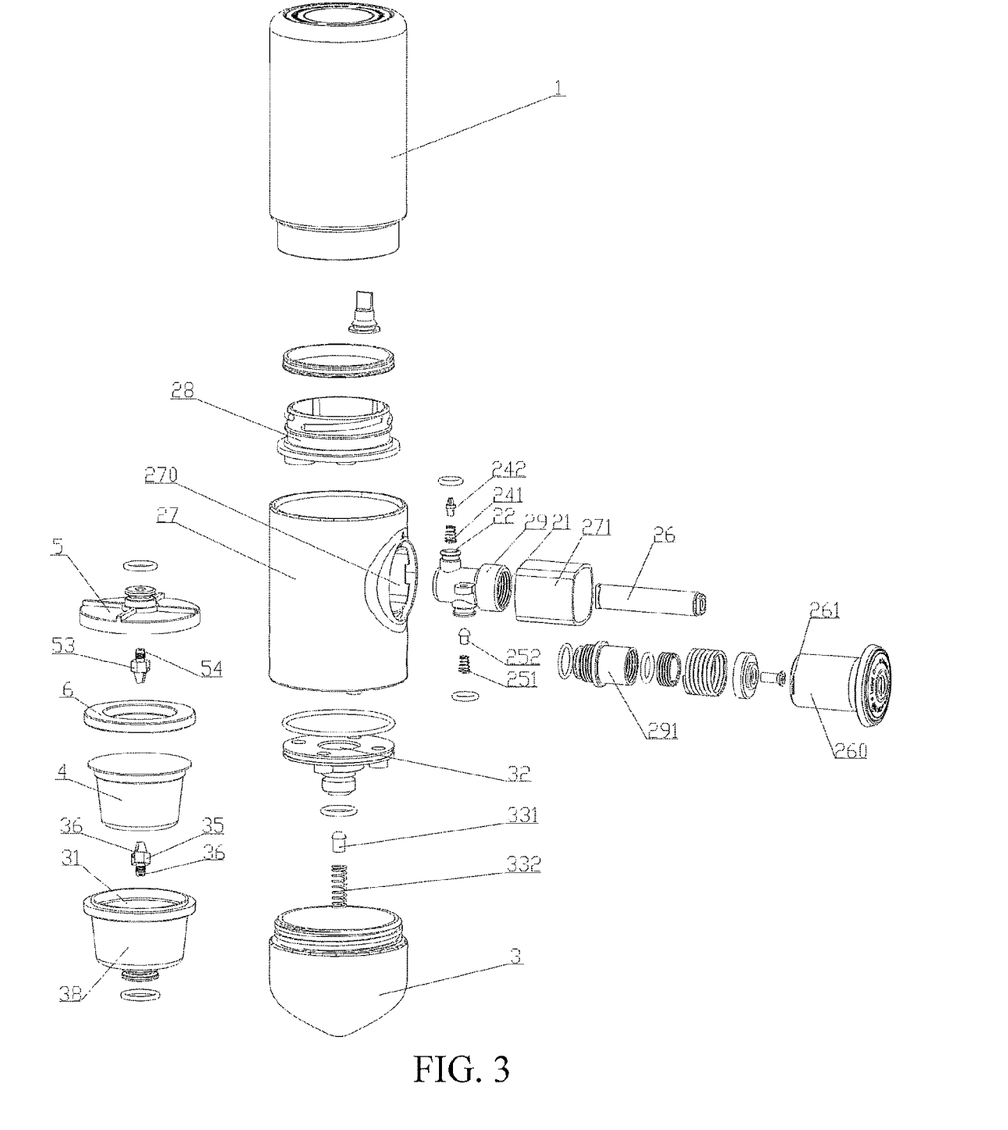
FIG. 3 is an exploded view of the present invention.

The coffee pod is usually wrapped by a packing layer, and the following devices are employed to facilitate puncturing of the packing layer. A water injection puncturing portion 53 capable of being inserted into the coffee pod 4 is disposed at a water outlet end (that is, a lower end) of the hydraulic base body 2 and above the accommodating cavity 31. A guide passage 54 in communication with the water outlet passage 23 and used for guiding water into the coffee pod 4 is disposed in the water injection puncturing portion 53. The guide passage 54 has a small diameter, so the water flow impacts the coffee pod 4 to easily produce air bubbles or coffee foam. In this way, the discharged coffee has air bubbles or foam and tastes better. A coffee guide passage 34 in communication with the coffee outlet passage 32 is disposed at a bottom portion of the accommodating cavity 31. An outlet puncturing portion 35 capable of being inserted into the coffee pod 4 is disposed on the coffee guide passage 34 and at the bottom end of the accommodating cavity 31. A coffee guide hole 36 in communication with the coffee guide passage 34 and used for guiding out the coffee in the coffee pod 4 is disposed in the outlet puncturing portion 35. A coffee pod accommodating cup 38 is disposed in the coffee brewing base body 3. The coffee pod accommodating cup 38 is detachably mounted in the coffee brewing base body 3 and is replaceable. According to different types of the coffee pod 4, for example, coffee powder, E.S.E coffee pod, coffee capsule of Caffitaly system, coffee capsule of K-fee, coffee capsule of Nespresso, coffee capsule of Lavazza point, coffee capsule of Lavazza blue, and coffee capsule of Lavazza Mio, the coffee pod accommodating cup 38 is selected according to the shape and size of each type, and is convenient to use. The accommodating cavity 31 is disposed in the coffee pod accommodating cup 38, and the outlet puncturing portion 35 is disposed on an inner wall of a bottom end of the coffee pod accommodating cup 38. A cup lid 5 for covering an open end of the coffee pod accommodating cup 38 is disposed on the water outlet end of the hydraulic base body 2, the cup lid 5 is disposed at a lower opening end of the hollow water tank base in the form of a hollow cylinder, the water injection puncturing portion 53 is disposed on the cup lid 5, and a seal ring 6 is disposed between the coffee pod accommodating cup 38 and the cup lid 5. The cup lid 5, the seal ring 6, and the coffee pod accommodating cup 38 define a space, so atmospheric pressure is easily produced in the accommodating cavity 31, and the coffee outlet control valve 33 is opened. In actual use, as the coffee pod 4 varies in size, the coffee pod accommodating cup 38 of a suitable size can be selected to replace the original one in the coffee brewing base body 3, so the entire device is more convenient to use.

Figure 4:
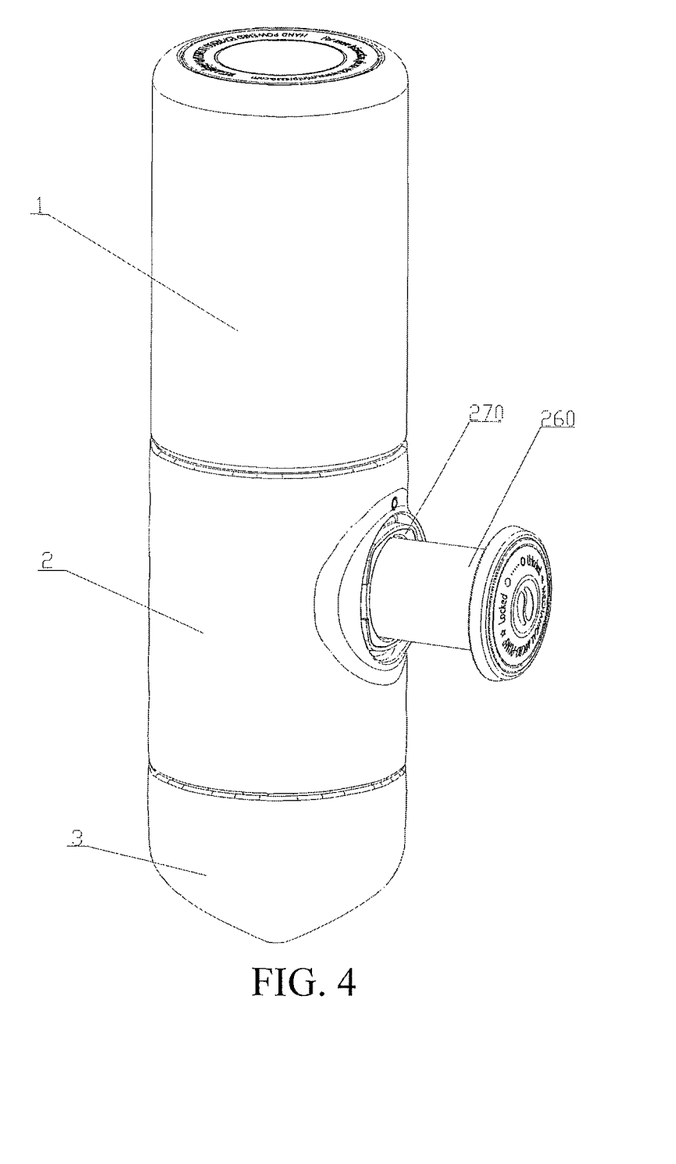
FIG. 4 is a reference view of the use state of the present invention.
Figure 5:
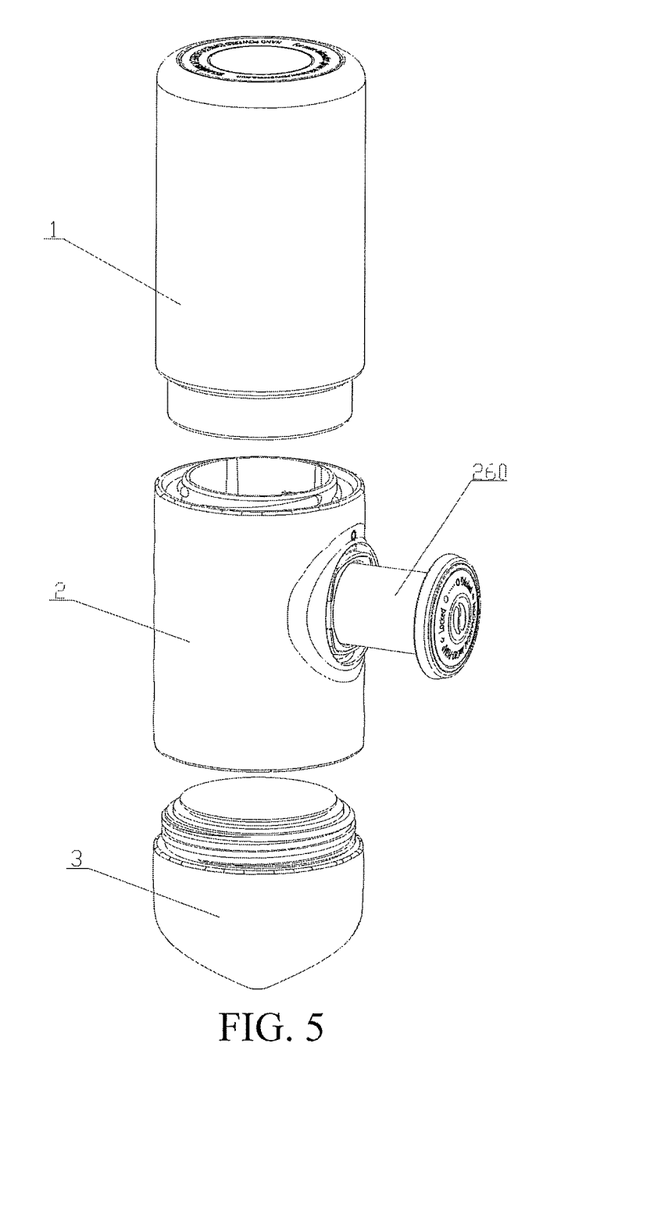
FIG. 5 is an assembly state view of the present invention.
Figure 6:
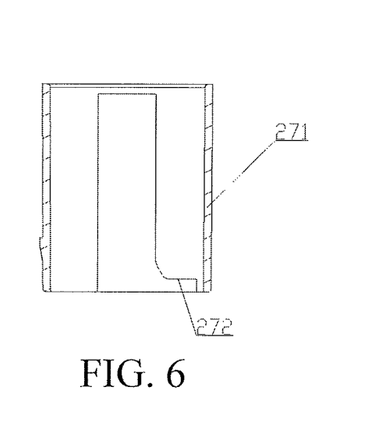
FIG. 6 is a front cross-sectional view of a button guide sleeve in the present invention.
Figure 7:
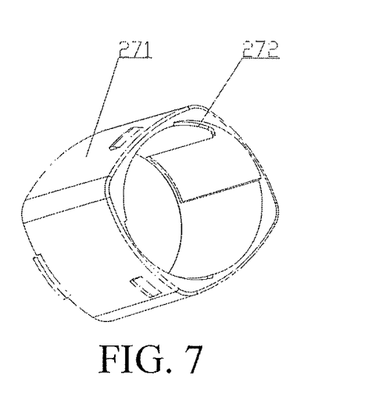
FIG. 7 is a three-dimensional view of the button guide sleeve in the present invention.
Figure 8:
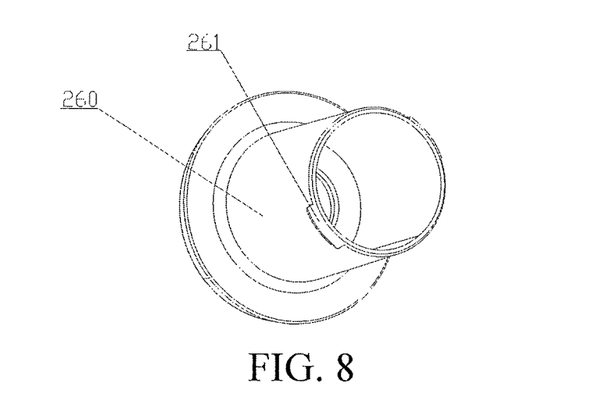
FIG. 8 is a three-dimensional view of a button in the present invention.

In the coffee maker, the cup body 1, the hydraulic base body 2, and the coffee brewing base body 3 are vertically connected, and the hydraulic power rod 26 is received in the water storage cavity 21 before use. When the coffee maker is used, the cup body 1 is filled with warm water, and the coffee pod is put in the coffee pod accommodating cup 38. When a casing 37 is connected to a bottom end of the hollow water tank base, the water injection puncturing portion 53 and the outlet puncturing portion 35 respectively puncture the upper and lower ends of the packing layer of the coffee pod. Then, the button 260 is turned, and the limiting boss 261 does not press against the arc-shaped step 272. In this case, the button 260 propels the piston rod to be popped out under the effect of the restoring spring 30. The button 260 is repeatedly pressed down and pulled out, so the piston rod moves back and forth in the water storage cavity 21 to produce a pressure difference. When the piston rod is pulled out, negative pressure is produced in the water storage cavity 21, the water inlet control valve core 242 moves downward, the water inlet passage 22 is opened, and water flows into the water storage cavity 21. When the piston rod is pushed inward, high pressure is produced in the water storage cavity 21, the water outlet control valve core 252 moves downward, the water outlet passage 23 is opened, and water flows into the coffee pod to brew coffee. When the pressure in the accommodating cavity 31 is sufficiently high, the coffee outlet control valve core 331 is pushed to move downward, and the coffee outlet port 302 is opened to discharge coffee. After the button 260 is pushed and pulled several times, coffee is discharged till brewing of the coffee pod is finished. Therefore, the operation is easy and convenient. The coffee maker is small in size, convenient to carry, and especially suitable for outdoor use.

What is claimed is:

1. A portable manually-operated coffee maker, comprising a cup body, a hydraulic base body, and a coffee brewing base body, wherein the cup body, the hydraulic base body and the coffee brewing base body are detachably connected into one piece, the hydraulic base body is disposed between the cup body and the coffee brewing base body; a water storage cavity, a water inlet passage, and a water outlet passage are disposed in the hydraulic base body; the water inlet passage is in communication with the water storage cavity and the cup body; an accommodating cavity in communication with the water outlet passage and capable of accommodating various types of coffee pods and a coffee outlet passage in communication with the accommodating cavity are disposed in the coffee brewing base body; the water outlet passage is in communication with the water storage cavity and the accommodating cavity; a water inlet control valve for controlling opening/closing of the water flow from the cup body to the water storage cavity is disposed in the water inlet passage, and a water outlet control valve for controlling opening/closing of the water flow from the water storage cavity to the accommodating cavity is disposed in the water outlet passage; and a hydraulic power rod for controlling the water inlet control valve to be opened when moving towards an outside of the water storage cavity and controlling the water outlet control valve to be opened when moving towards an inside of the water storage cavity is disposed in the water storage cavity.

2. The portable manually-operated coffee maker according to claim 1, wherein a coffee outlet control valve for controlling opening/closing of the water flow in the coffee outlet passage is disposed in the coffee outlet passage.

3. The portable manually-operated coffee maker according to claim 1, wherein the cup body and the hydraulic base body are in threaded connection.

4. The portable manually-operated coffee maker according to claim 1, wherein the hydraulic base body and the coffee brewing base body are in threaded connection.

5. The portable manually-operated coffee maker according to claim 1, wherein a water injection puncturing portion capable of being inserted into the coffee pod is disposed above the accommodating cavity, a guide passage in communication with the water outlet passage and used for guiding water into the coffee pod is disposed in the water injection puncturing portion, a coffee guide passage in communication with the coffee outlet passage is disposed at a bottom portion of the accommodating cavity, an outlet puncturing portion capable of being inserted into the coffee pod is disposed on the coffee guide passage and at a bottom end of the accommodating cavity, and a coffee guide hole in communication with the coffee guide passage and used for guiding out coffee in the coffee pod is disposed in the outlet puncturing portion.

6. The portable manually-operated coffee maker according to claim 5, wherein a coffee pod accommodating cup is disposed in the coffee brewing base body, the accommodating cavity is disposed in the coffee pod accommodating cup, and the outlet puncturing portion is disposed on an inner wall of a bottom end of the coffee pod accommodating cup.

7. The portable manually-operated coffee maker according to claim 5, wherein a cup lid for covering an open end of the coffee pod accommodating cup is disposed on a water outlet end of the hydraulic base body, the water injection puncturing portion is disposed on the cup lid, and a seal ring is disposed between the coffee pod accommodating cup and the cup lid.

8. The portable manually-operated coffee maker according to claim 1, wherein the hydraulic base body is a hollow water tank base connected to an open end of the cup body, a hydraulic power rod extending port is disposed on a side wall of the hydraulic base body, a water tank lid in communication with the cup body and the water inlet passage is disposed on the hydraulic base body and at one end of the cup body, a water tank is disposed in the hydraulic base body, the water storage cavity is disposed in the water tank, a hydraulic power rod sliding guide sleeve fitted on the hydraulic power rod is disposed on the water tank and connected to one end of the hydraulic power rod extending port, the hydraulic power rod is provided with a button connected to one end of the hydraulic power rod extending port, a button guide sleeve for guiding the button is disposed in the hydraulic base body, and a restoring spring is disposed between the button and the hydraulic power rod sliding guide sleeve.

9. The portable manually-operated coffee maker according to claim 8, wherein the button guide sleeve is provided with an arc-shaped step on an end surface of an inner side of the water storage cavity, and the button is provided with a limiting boss on one end of the inside of the water storage cavity, the limiting boss being capable of pressing against the arc-shaped step to prevent the button from axially sliding out when the button is turned by a certain angle.

10. The portable manually-operated coffee maker according to claim 8, wherein a water inlet port in communication with the cup body and the water inlet passage is disposed on the water tank lid, the water inlet control valve comprises a water inlet control spring having one end resting on an inner wall of the water inlet passage and a water inlet control valve core pressing against another end of the water inlet control spring, an end surface of the water inlet control valve core is capable of blocking the water inlet port, and the water outlet control valve comprises a water outlet control valve core having one end capable of blocking the water outlet port of the water outlet passage and a water outlet control spring having one end pressing against the hollow water tank base and another end pressing against the water outlet control valve core.

11. The portable manually-operated coffee maker according to claim 2, wherein the coffee outlet control valve comprises a coffee outlet control valve core having one end capable of blocking a coffee outlet port of the coffee outlet passage and a coffee outlet control spring having one end urged against the coffee outlet control valve core and another end pressing against an inner wall of the coffee outlet passage.

12. The portable manually-operated coffee maker according to claim 1, wherein the cup body is a single-layer cup body made of plastic or metal.

13. The portable manually-operated coffee maker according to claim 1, wherein the cup body is a double-layer cup body made of plastic or metal.

14. The portable manually-operated coffee maker according to claim 13, wherein the double-layer cup body comprises an inner layer having a water accommodating cavity and an outer layer outside the inner layer.

\* \* \* \* \*